Sept. 6, 1960   B. E. WILLIAMS   2,951,434
ELECTRIC COOKING DEVICE
Filed Dec. 13, 1957   2 Sheets-Sheet 1

INVENTOR
BEVERLY E. WILLIAMS
BY Cameron, Kerkam & Sutton
ATTORNEYS

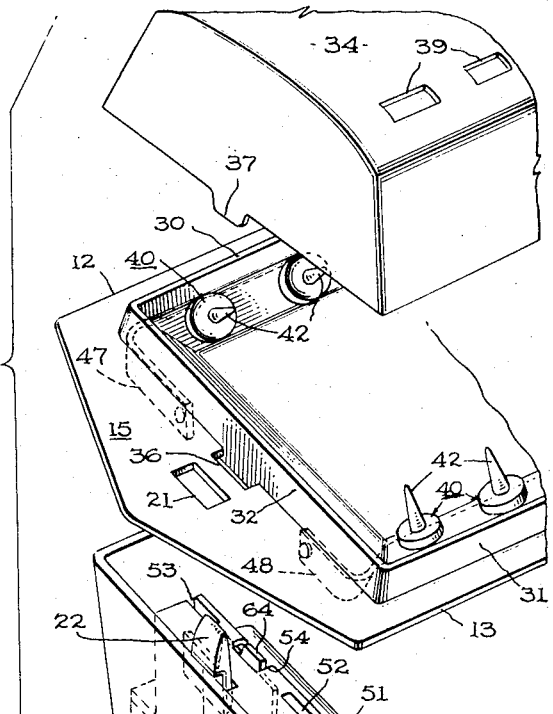
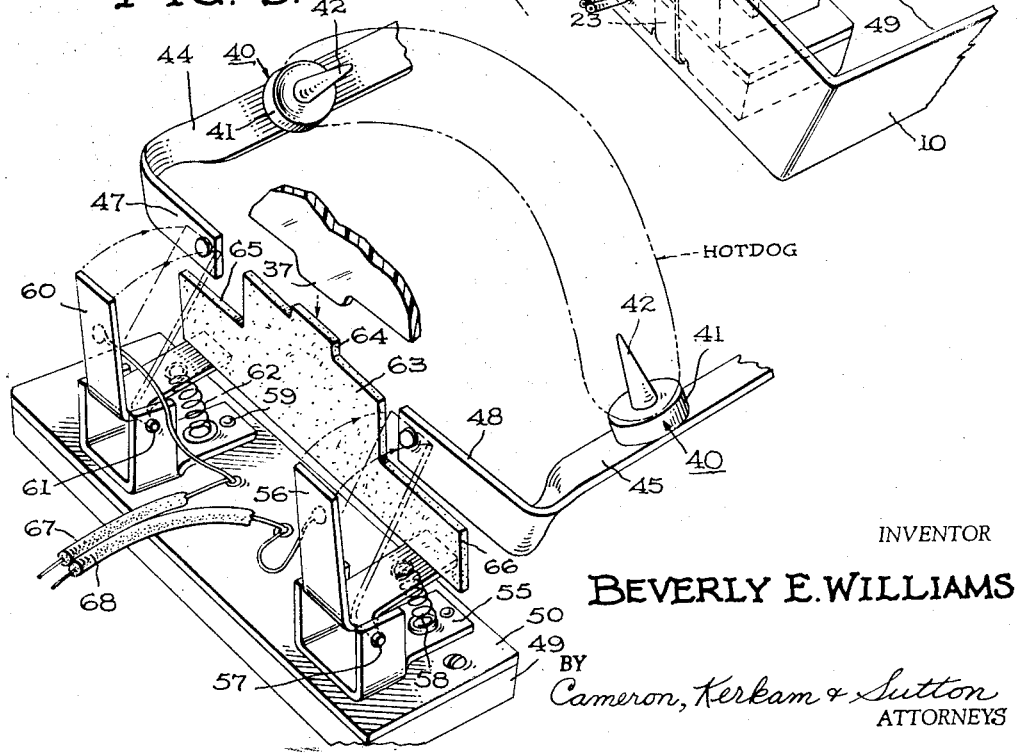

United States Patent Office 2,951,434
Patented Sept. 6, 1960

2,951,434

ELECTRIC COOKING DEVICE

Beverly E. Williams, Hillsborough, Calif., assignor to Hodges Research and Development Company, New York, N.Y., a corporation of California Filed Dec. 13, 1957, Ser. No. 702,562

13 Claims. (Cl. 99—337)

This invention relates to electric cooking devices and more particularly to such devices for simultaneously cooking a plurality of elongated food products such as frankfurters.

Heretofore various electrical cooking devices for elongated food products such as frankfurters have been proposed in which the frankfurters are impaled upon opposed electric contacts so that electric current may be passed through the food product to cook the same. These prior art devices have disadvantages which have prevented commercial acceptance. In some of these the electric contacts are such that the food product is charred when current is passed therethrough creating an undesirable flavor. In others cleaning the cooker is difficult and in others the construction is such that the user may be subject to electric shock if the cooker is handled carelessly.

It is therefore an object of the present invention to provide a novel electric cooking device for elongated food products such as frankfurters in which a plurality of the food product can be cooked simultaneously which overcomes the disadvantages of the prior art structures.

Another object is to provide such a cooking device which may be readily cleaned after use.

Another object is to provide such a cooking device which is so constructed and arranged that the user is completely protected from the hazards of electric shock.

Another object is to provide such a cooker in which the electric contacts upon which the food product is impaled are so shaped that charring of the food product is minimized or prevented with consequent enhancement of the taste of the cooked food product.

Another object is to provide such a device which is of pleasing appearance and which may be readily and relatively cheaply manufactured to meet the demands of commercial competition.

Another object is to provide such a cooking device which from the point of view of safety and strength of construction will meet the requirements of the various safety codes.

Another object is to provide such a device which is easily used by the inexperienced and by children without risk.

Other and further objects of the present invention will appear from the following description of an illustrative embodiment thereof.

The novel electric cooking device of the present invention is capable of various mechanical embodiments one of which is shown in the accompanying drawings and is described hereinafter to illustrate the invention. This illustrative embodiment of the invention should in no way be construed as defining or limiting the same and reference should be had to the appended claims to determine the scope of this invention.

In the accompanying drawings, in which like reference characters indicate like parts, Fig. 1 is a view from above of an embodiment of the electric cooking device of the present invention it being noted that the cover is made of suitable transparent material so that when closed the interior thereof is seen;

Fig. 4 is an expanded view of the left portion of the embodiment of Fig. 1 to show the relative position and operation of the electric switch; and Fig. 5 is a view of the electric switch located in the left end of the embodiment of Fig. 1 with the various covers removed to show the construction thereof.

Figure 1:
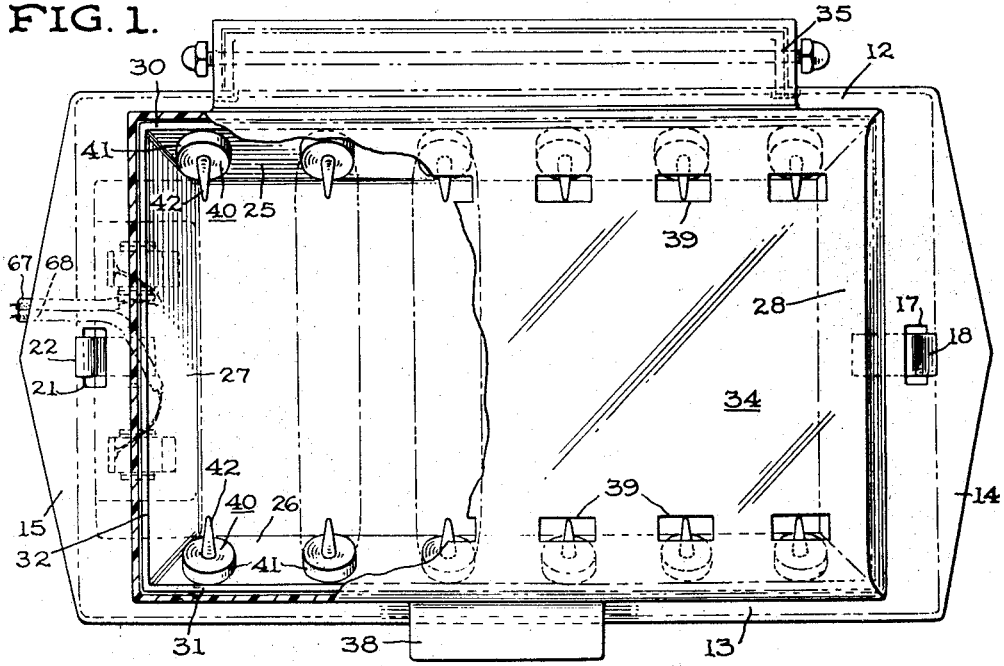
Figure 2:
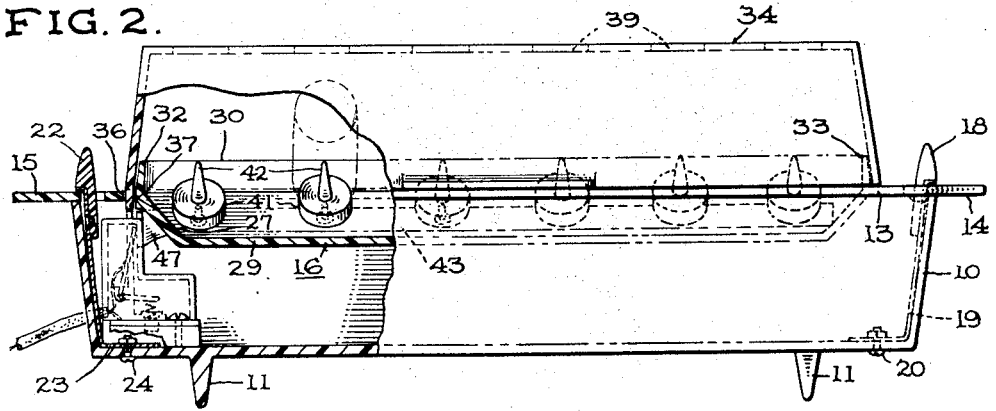
Fig. 2 is a side view, partially in section of the embodiment of Fig. 1.

Referring now to the several figures, the electrical cooking device of this embodiment includes a more or less rectangularly shaped dish-shaped base 10 having suitable supporting feet 11.

Base 10 may be of any suitable dimensions and depth and is here shown of a size to cook six food products at one time. Member 10 may be made of any suitable material and is preferably cast from a non-inflammable plastic.

A suitable tray 16 is mounted for ready removal on the open top of base 10 and tray 16 is provided with side flanges 12 and 13 and end flanges 14 and 15 to support tray 16 on base 10. Flange 14 is apertured at 17 to receive a manually actuable latch 18 which is carried by spring 19 secured as by bolt 20 in base 10 and flange 15 is similarly apertured at 21 to receive manually actuable latch 22 which is carried by spring 23 secured by bolt 24 in base 10. Thus when tray 16 is properly positioned on the top of base 10 latches 18 and 22 will pass through apertures 17 and 21, respectively, and by the action of springs 19 and 23, respectively, will lock tray 16 in place.

Tray 16 is provided with a substantially rectangularly shaped depression defined by inwardly slanting side walls 25 and 26 and inwardly slanting end walls 27 and 28. Side walls 25 and 26 and end walls 27 and 28 form an integral connection with bottom 29.

Tray 16 is provided with upstanding sidewalls 30 and 31 and corresponding upstanding end walls 32 and 33 surrounding the depression in tray 16.

A dish-shaped lid 34 preferably cast of transparent non-inflammable plastic material is suitably hinged at 35 to base 10 and is so shaped that when in closed position it rests upon tray 16 and encloses upstanding walls 30, 31, 32, and 33.

Tray 16 is suitably apertured at 36 to receive a downwardly depending extension 37 formed on the lower edge of one end of cover 34 for purposes which will appear more fully hereinafter. Cover 34 is provided with an outwardly extending tab 38 so that the same may be readily opened and closed by rotation about hinge 35. Suitable apertures 39 are let into cover 34 adjacent the electrical contacts so that steam and cooking vapors may have ready exit from the cooking device.

A plurality of spaced electric contacts 40 are mounted on walls 25 and 26 and are arranged in pairs in opposed relationship so that that the elongated food product to be cooked may be mounted between opposed contacts 40 of each pair. It is to be expressly understood that as many pairs of contacts 40 as may be required may be used and that the six pairs of contacts 40 here shown are illustrative only.

Each contact 40 includes a circular dished base 41 having a centrally disposed upstanding pointed pin 42. With this construction when an elongated food product such as a frankfurter having rounded ends is to be cooked pin 42 impales the end of the food product axially and the rounded end portion of the food product fits into and engages the dish-shaped disc 41, as is clearly seen in Fig. 5, to provide maximum contact area with the electric contact 40 to prevent charring of the food product during cooking.

A bus bar 43 extends along the outside of wall 25 and each of electrical contacts 40 supported by wall 25 is electrically connected to bus bar 43 as by screws 44 which pass through bus bar 43 and through wall 25 and into contacts 40. A similar bus bar 45 extends along wall 26 and is electrically connected to the electric contacts 40 carried by wall 26 as by screws 46 which pass through bus bar 45 through wall 26 and into the electrical contacts 40. Bus bar 44 is provided with an inwardly turned extension 47 which lies beneath wall 27 and bus bar 45 is provided with a similar inturned extension 48 which lies beneath wall 27 and is spaced from extension 47.

Referring now to Figs. 4 and 5, the electric switch structure there disclosed includes a base 49 of insulating material upon which a second plate 50 is mounted. A suitable housing 51 covers the entire switch structure and rests upon plate 50 and is apertured at 52 and 53 to receive ends 48 and 47, respectively, of bus bars 44 and 45, respectively. Housing 51 is also apertured at 54 to receive extension 37 when lid 34 is closed.

A U-shaped bracket 55 is mounted upon plate 50 within housing 51 and supports L-shaped switch member 56 for rotation on pivot 57. A spring 58 urges switch member 56 in a counterclockwise direction as seen in Fig. 5. When switch member 56 is rotated in a clockwise direction, as seen in Fig. 5, it will be rotated toward electrical contact with end 48 of bus bar 45. A second U-shaped bracket 59 is mounted on plate 50 within housing 51 and supports L-shaped switch member 60 for rotation on pivot 61. A spring 62 urges switch member 60 in a counterclockwise direction as seen in Fig. 5. Clockwise rotation of switch member 60 rotates member 60 toward electrical contact with extension 47 of bus bar 44. An actuating plate 63 having an upwardly extending portion 64 for engagement by extension 37 of top 34 is mounted for vertical reciprocating movement in housing 51. Plate 63 is provided with lateral extensions 65 and 66 which engage switch members 60 and 56, respectively, to rotate the same toward engagement with their respective extensions of the bus bars. It should be noted that when member 63 is in its upward position extensions 65 and 66 close slots 53 and 52, respectively.

When tray 16 is placed in position on the top of base 10 and is aligned so that latches 18 and 22 pass through apertures 17 and 21, respectively, to lock the tray in position with respect to base 10, extensions 47 and 48 enter slots 53 and 52, respectively, and move member 63 downward rotating switch members 56 and 60 toward contact with extensions 47 and 48. When lid 34 is rotated about pivot 35 to closed position extension 37 thereof enters aperture 36 in tray 16 and engages extension 64 of member 63 to further depress member 63 to complete the rotation of switch members 56 and 60 into electrical contact with extensions 47 and 48 of bus bars 44 and 45, respectively. A double safety feature is thus provided which prevents electric current from being supplied to electrical contacts 40 before tray 16 is firmly locked in position on base 10 and before lid 34 is completely closed.

Electric current is supplied from any suitable source through wires 67 and 68 which are electrically connected with switch members 60 and 56, respectively.

As noted above, when lid 34 is fully closed so that electric current is supplied to contacts 40 walls 30, 31, 32 and 33 extend upwardly within cover 34 to prevent the insertion of a utensil or other electrical conductor within the cooking device so that a user of the device cannot receive an electric shock by accidental contact with one of the electric contacts 40. If lid 34 is raised sufficiently to permit the insertion of a utensil or other conductor within the cooking device extension 37 there-of disengages extension 64 of member 63 permitting springs 62 and 58 to rotate electric contacts 60 and 56, respectively, out of engagement with their respective extensions 47 and 48 of bus bars 44 and 45 breaking the electric circuit to contacts 40. Another safety feature is therefore provided by the present invention which prevents the users thereof from accidental electric shock.

Figure 3:
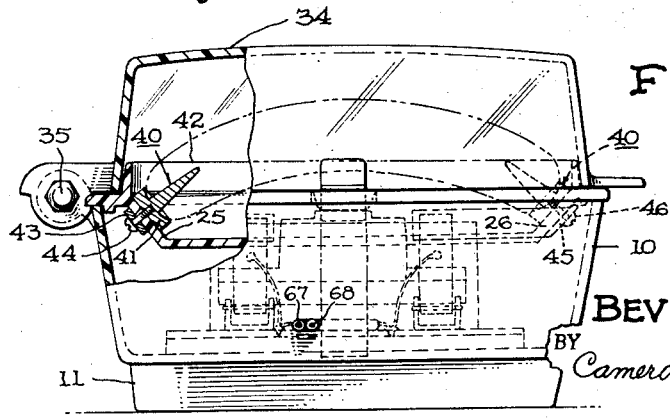
Fig. 3 is an end view, partly in section, as seen from the left in Fig. 1.

When lid 34 is fully rotated in a counterclockwise direction as seen in Fig. 3 tray 16 may be readily removed by suitable movement of latches 18 and 22 for cleansing. When lid 34 is open the electric switches 56 and 60 are open so that the bus bars 44 and 45 are not energized. Removal of tray 16 from base 10 moves bus bar extensions 47 and 48 out of housing 51 and extensions 65 and 66 of plate 63 then close apertures 52 and 53, respectively. The interior of base 10 may then be cleansed without fear of accidental contact with switch members 56 and 60 should wires 67 and 68 be connected to the source of electric power.

It should now be apparent that the present invention in every way satisfies the several objectives described above while satisfying the requirements for a safe electrical cooking device for use by the young and inexperienced.

Changes in or modifications to the above described illustrative embodiment of this invention may now be suggested to those skilled in the art without departing from the present inventive concept. Reference should therefore be had to the appended claims to determine the scope of this invention.

What is claimed is:

1. In an electrical cooking device for elongated food products, a dish-shaped base, a tray removably closing the open top of said base, a substantially rectangular depression formed in said tray, a plurality of spaced electric contacts mounted on two opposed walls of said rectangular depression forming spaced opposed pairs of contacts with each pair of contacts adapted to receive an elongated food product therebetween, a bus bar electrically connecting said contacts on one side of said depression, a second bus bar electrically connecting said contacts on the opposite side of said depression, electrical switch means mounted in said base for each of said bus bars, means for moving each of said switch means toward engagement with its respective bus bar actuated by said bus bars when said tray is mounted on the top of said base, a cover pivotally mounted on said base and enclosing said electric contacts when in closed position and means carried by said cover engaging said switch moving means when said cover is closed for completing the movement of said switch means into electrical contact with said bus bars.

2. A cooking device as described in claim 1 in which each of said electric contacts consists of a dished base and a pointed member extending from the center of said dished base, the elongated food product being adapted to be impaled axially on said pointed member with the adjacent end thereof contacting the dished surface of said dished base.

3. A cooking device as described in claim 1 having upstanding walls surrounding said depression in said tray received within said cover when said cover is in closed position.

4. A cooking device as described in claim 1 including manually actuable latch means mounted within said base and extending through said tray locking said tray in position closing the top of said base.

5. A cooking device as described in claim 1 including a housing surrounding said switch means and said switch moving means, apertures in said housing receiving said bus bars for actuation of said switch moving means, said switch moving means closing said apertures when said tray is removed from said base, said means carried by said cover engaging said switch moving means passing through said tray and through said housing when said cover is closed.

6. In an electrical cooking device for frankfurters, a dish-shaped base, a tray removably closing the open top of said base, two spaced parallel rows of spaced electric contacts mounted on said tray forming opposed pairs of contacts with each pair of contacts adapted to receive a frankfurter, a bus bar electrically connecting one of said rows of contacts, a second bus bar electrically connecting the other of said rows of electrical contacts, electrical switch means mounted in said base for each of said bus bars, means for moving each of said switch means toward engagement with its respective bus bar actuated by said bus bars when said tray is mounted on the top of said base, a cover pivotally mounted on said base and enclosing said electric contacts when in closed position and means carried by said cover engaging said switch moving means when said cover is closed for completing the movement of said switch means into electrical contact with said bus bars.

7. A cooking device as described in claim 6 in which each of said electric contacts consists of a dished base and a pointed member extending from the center of said dished base, the frankfurter being adapted to be impaled axially on said pointed member with the adjacent end thereof contacting the dished surface of said dished base.

8. A cooking device as described in claim 6 having upstanding walls on said tray enclosing said electric contacts and received within said cover when said cover is in closed position.

9. A cooking device as described in claim 6 including resilient latch means mounted in said base and engaging and locking said tray in position closing the top of said base.

10. A cooking device as described in claim 6, said switch moving means including a movable plate, a housing surrounding said switch means and said plate, apertures in said housing receiving said bus bars for engagement with said plate, said plate closing said apertures when said tray is removed from said base, said means carried by said cover engaging said plate passing through said tray and through said housing when said cover is closed.

11. An electrical frankfurter cooker including a housing having an access opening and a cover for said opening, a tray removably mounted within said housing, said tray having a depressed central portion and electrodes projecting upwardly and inwardly, spaced on opposite sides of said central portion, conductors on said tray extending from said electrodes and having terminal portions projecting from the tray, means forming a closed switch compartment in said casing, openings in said compartment through which said projecting terminal portions are adapted to extend when the tray is installed within the casing, switch means within said compartment and means on said cover adapted to close said switch means to energize said electrodes when said cover is moved to closed position over said access opening of the casing.

12. An electrical frankfurter cooker including a housing having an access opening and a cover for said opening, a tray insertable into said opening and removably mounted within said housing, said tray having a depressed central portion and electrodes projecting upwardly and inwardly, spaced on opposite sides of said central portion, conductors on said tray extending from said electrodes and having terminal portions projecting from the tray, means forming switch elements in said housing, said projecting terminal portions extending adjacent said switch elements when the tray is installed within the housing and means on said cover for effecting connection of said switch elements with said terminal portions to energize said electrodes in response to motion of the cover to its closed position over said access opening and when voltage is applied to the switch elements, said housing and tray when the tray is installed within the housing preventing access to said switch elements and terminal portions.

13. An electrical frankfurter cooker including a housing having an access opening and a cover for said opening, a tray removably mounted within said housing, said tray having a depressed central portion and electrodes projecting upwardly and inwardly spaced on opposite sides of said central portion, conductors on said tray extending from said electrodes and having terminal portions projecting from the tray, means forming a switch in said housing, said projecting terminal portions engaging said switch means when the tray is installed within the housing, and means on said cover adapted to close said switch means to energize said electrodes when said cover is moved to closed position over said access opening of the housing.

References Cited in the file of this patent
UNITED STATES PATENTS
2,052,919    Brogdon _____ Sept. 1, 1936